(12) United States Patent
Prust et al.

(10) Patent No.: US 6,836,941 B2
(45) Date of Patent: Jan. 4, 2005

(54) MACHINE TOOL FOR MACHINING A ROD-SHAPED WORKPIECE

(75) Inventors: Dirk Prust, Tuttlingen (DE); Rudolf Haninger, Seitingen-Oberflacht (DE)

(73) Assignee: Chiron-Werke GmbH & Co. KG, Tuttlingen (DE)

( * ) Notice: Subject to any disclaimer, the term of this patent is extended or adjusted under 35 U.S.C. 154(b) by 0 days.

(21) Appl. No.: 10/147,126

(22) Filed: May 16, 2002

(65) Prior Publication Data

US 2002/0189063 A1 Dec. 19, 2002

(30) Foreign Application Priority Data

May 17, 2001 (DE) .......................................... 101 25 729
Sep. 10, 2001 (DE) .......................................... 101 45 673

(51) Int. Cl.[7] .............................. B23P 23/02; B23C 3/02
(52) U.S. Cl. .................... 29/27 C; 409/201; 409/165; 409/159; 408/236; 408/71
(58) Field of Search ................................. 29/27 C, 27 R; 409/201, 204, 211, 216, 242, 165, 166, 167, 225, 221, 219; 408/236

(56) References Cited

U.S. PATENT DOCUMENTS

| | | | |
|---|---|---|---|
| 2,275,291 A | * | 3/1942 | Bannow ...................... 409/216 |
| 2,281,353 A | * | 4/1942 | Hubbard ..................... 409/211 |
| 2,619,879 A | * | 12/1952 | Hosea ......................... 409/211 |
| 3,083,617 A | * | 4/1963 | Swanson et al. ............. 409/211 |
| 3,359,861 A | * | 12/1967 | Johnson et al. ............. 409/211 |
| 3,371,580 A | | 3/1968 | Barnes et al. .................. 90/11 |
| 3,570,369 A | * | 3/1971 | Hoddinott et al. ............. 29/39 |
| 3,577,828 A | * | 5/1971 | Stickney ..................... 409/199 |
| 3,806,691 A | * | 4/1974 | Roach ........................ 408/236 |
| 4,657,453 A | * | 4/1987 | Goulot et al. ............... 409/216 |
| 4,904,131 A | * | 2/1990 | Affaticati .................... 409/216 |
| 5,385,436 A | * | 1/1995 | Corsi ......................... 409/201 |
| 5,538,375 A | * | 7/1996 | Kwapisz ..................... 409/201 |
| 5,964,016 A | * | 10/1999 | Ito et al. ...................... 29/27 C |

FOREIGN PATENT DOCUMENTS

| | | | |
|---|---|---|---|
| DE | 3824602 | 1/1990 | ........... B23Q/37/00 |
| DE | 199 19 647 A1 | 11/2000 | |
| DE | 199 48 335 | 7/2001 | ........... F16H/21/00 |
| EP | 0 666 132 | 8/1995 | ........... B23Q/1/48 |
| EP | 0 799 671 B1 | 10/1997 | |
| JP | 01222809 A | * 9/1989 | ............. B23C/1/12 |

* cited by examiner

Primary Examiner—A. L. Wellington
Assistant Examiner—Dana Ross
(74) Attorney, Agent, or Firm—Weingarten, Schurgin, Gagnebin & Lebovici LLP

(57) ABSTRACT

A machine tool for machining rod-shaped workpieces comprises a traveling column, to which a tool spindle rotatable about a spindle axis is fastened. The tool spindle is capable of swiveling about a swivel axis. The swivel axis is arranged perpendicularly to both the spindle axis and a longitudinal axis of the workpiece.

28 Claims, 8 Drawing Sheets

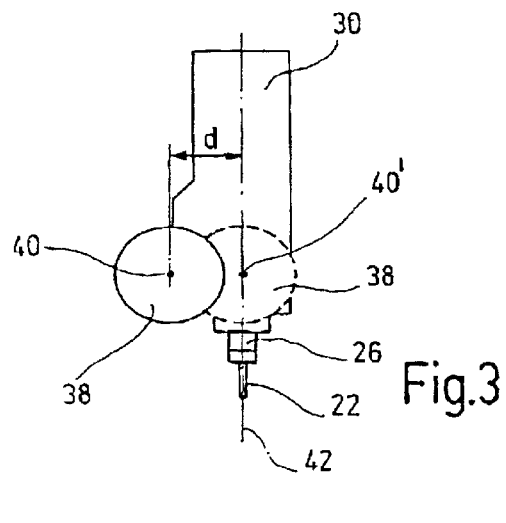
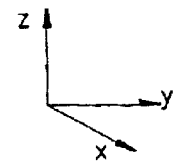
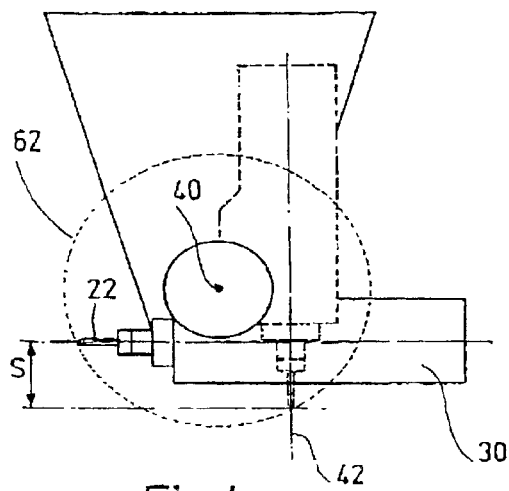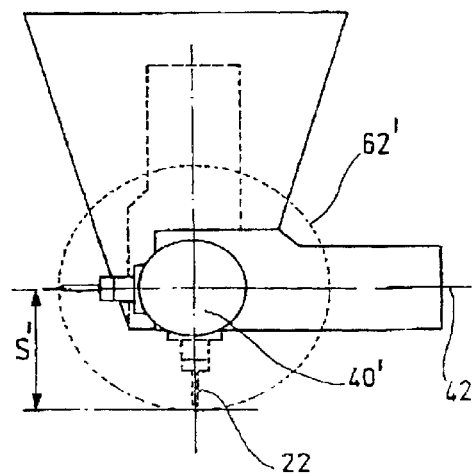
Fig.4a   Fig.4b

MACHINE TOOL FOR MACHINING A ROD-SHAPED WORKPIECE

BACKGROUND OF THE INVENTION

The invention relates to a machine tool for machining a rod-shaped workpiece, and, in particular, to a machine tool having a traveling column, to which a tool spindle rotatable about a spindle axis is fastened.

From DE 199 19 647 A1, a traveling-column machine is known, on the machine bed of which a workholding fixture for a workpiece is arranged. The workholding fixture is capable of swiveling about a horizontal axis, so that both a longitudinal side and an end face opposite the clamping point of a workpiece clamped therein can be machined by a tool which is accommodated in a tool spindle fastened to the traveling column. In order to also be able to machine the sixth workpiece side, a type of robot arm (manipulator) is provided, this robot arm being swivelable about a vertical axis and having a gripper. After the completion of the machining of the five sides of the workpiece which are accessible first of all, the gripper takes the workpiece out of the workholding fixture. The robot arm is then swiveled by 90° in the horizontal and by 180° about its longitudinal axis and the gripper is put into a clamping station. The clamping station holds and fixes the gripper and, thus, the workpiece which is still accommodated therein in a precise position, so that the workpiece can now also be machined on its sixth side by the tool.

It is a disadvantage of this known machine tool that either only relatively short workpieces in the workholding fixture can be swiveled into a vertical position in order to permit a machining of the free end face, or a large swivel space has to be provided, which allows a swiveling of longer workpieces, too.

SUMMARY OF THE INVENTION

Thus, it is an object of the present invention to improve a machine tool of the type mentioned before. It is particularly an object to provide a machine tool which, on the one hand, can be designed spatially compact and which, on the other hand, allows even long workpieces to be machined at their free end face.

For a machine tool of the type described before, this object can be achieved according to one aspect of the invention by the feature that the tool spindle is adapted to swivel about a swivel axis which is arranged perpendicularly to both the spindle axis and a longitudinal axis of the workpiece.

Owing to such a swivelable arrangement of the tool spindle, the free end face of the workpiece can be machined without the workpiece being required to be swiveled. This is particularly advantageous for long workpieces, because the large swivel space otherwise required can be eliminated.

According to a preferred refinement, the tool spindle is adapted to swivel by a swivel angle of at least 90°.

This provides the advantage that a machining can be carried out perpendicularly with respect to the end face of the workpiece. With swivel angles of more than 90°, even the bottom side of the workpiece can be reached by the tool. This is particularly important, if the workpiece itself cannot be turned about its longitudinal axis.

According to another preferred refinement, the swivel axis is arranged so as not to intersect the spindle axis.

This enables the spindle to be fastened to the traveling column in a more simple manner in terms of design and in a more robust manner, since a swiveling device provided for swiveling the tool spindle is not interrupted by the tool spindle. Apart from that, this feature is also advantageous in such machine tools in which the swivel axis is not oriented perpendicularly to the longitudinal axis of the workpiece but is oriented in another way, for example parallel thereto.

In another preferred refinement, the tool spindle, preferably together with a drive for it, is accommodated in a spindle housing, and the swivel axis runs at the level of the front half of the spindle housing, wherein said front half is characterized by a tool carrier. Even more preferably, the spindle axis is located in the area of the front quarter of the spindle housing.

Owing to a small distance between tool carrier and swivel axis, the tool moves on a circular path of small radius during the swiveling of the tool spindle. This allows short compensating movements of the traveling column if only the angular position of the tool, but not its spatial position as such, is to be varied. Together with the arrangement of swivel axis and spindle axis in such a way that they do not intersect, short traverse paths of the traveling column in the direction perpendicularly to the longitudinal axis of the workpiece and perpendicularly to the swivel axis can be realized. In traveling-column machines of the conventional style, in which both the workpieces and the swivel axis are arranged horizontally, the traverse paths in the vertical are shortened by this measure. Consequently, such a machine tool requires a small amount of space in the vertical; the "Z-axis" can therefore be designed with a short stroke.

The smaller the distance between the swivel axis and the tool, the smaller is the radius of movement of the tool during the swiveling movement. However, the swivel axis should not be arranged too close to the tool, since the space around the tool should remain free in order to ensure that the tool can reach and machine the workpiece in all positions desired without impairment by a swiveling device for providing the swiveling capability. Therefore, a swiveling device is preferably located in the immediate vicinity of an end face of the spindle housing, or even terminates flush with this end face.

It is furthermore preferred, if the machine tool comprises a first holder and a second holder for accommodating the workpiece, wherein the second holder, in a machining position, is oriented coaxially to the first holder and being adapted to rotate or swivel about an axis perpendicular to a longitudinal axis of the workpiece.

Due to the rotating and swiveling capability of the second holder, the workpiece accommodated therein can be moved away from the first holder to such an extent that the clamping point is accessible for machining by a tool inserted into the tool spindle. In order to be able to rotate or swivel the workpiece, it may have been be severed, for example, beforehand at a point between the first holder and the second holder, e.g. by milling or sawing. However, the workpiece may also be rotated or swiveled in one piece, i.e. as an entity, with the second holder if it is completely pushed out of the first holder beforehand. This may be effected, for example, by a feed device known per se or by means of a second workpiece which is inserted into the first holder and pushes the first workpiece out of the latter in the process.

If the first holder is designed as a rotary table or NC lathe spindle, six-sided machining of the workpiece is thus possible, since the clamping point of the workpiece also becomes accessible for machining by rotating or swiveling the second holder. This aspect is especially important, for example, when aluminum profiles are to be machined, since such profiles are often to be machined mainly at the end face at both ends.

In addition, if the perpendicular axis about which the second holder is rotatable or swivelable is also arranged perpendicularly to the swivel axis of the tool spindle, machining of the workpiece is possible in any spatial angular position between tool and workpiece. This also applies to the sixth side (clamping point) of the workpiece. This special feature is achieved without redundancy, i.e. with minimum design input.

In a traveling-column machine, that clamping point of the workpiece which has been freed by the rotation or swiveling is preferably approached by the tool spindle and machined with the tool accommodated therein. Alternatively, it is preferred to traverse the second holder in such a way that the clamping point of the workpiece is fed into the rotating tool spindle, which is otherwise spatially fixed.

In a preferred development of this configuration, the second holder is adapted to rotate or swivel by at least 180°.

In this way, the workpiece held by the second holder can be completely turned round, as a result of which the point at which it was held beforehand in the first holder becomes readily accessible. If this should be desired, the workpiece can also be turned round repeatedly, so that the axial ends of the workpiece can be machined alternately.

If the second holder is adapted to be rotatable, the coaxial orientation relative to the first holder is retained after the rotation. On the other hand, with a swiveling movement of the second holder by 180°, a parallel rather than a coaxial orientation relative to the first holder might be achieved. A swiveling movement is often to be preferred compared with a rotary movement, since a collision of the workpiece held by the second holder with a workpiece still located in the first holder. e.g. a part cut off previously, is easily prevented then.

It is especially preferred if the second holder is arranged eccentrically to the perpendicular axis in order to achieve the swiveling movement. The perpendicular axis does not intersect the longitudinal axis of the workpiece then.

In a preferred refinement of this configuration, the second holder is arranged on a support rotatable about the perpendicular axis. Preferably, at least one further holder is arranged on the support eccentrically to the perpendicular axis, so that the further holder, by rotation of the support about the perpendicular axis, can be shifted into a position coaxial to the first holder.

In this way, a plurality of holders, preferably different holders, can be made available for accommodating workpieces by a simple rotary movement of the support. The holder selected is oriented coaxially in alignment with the first holder by rotating the support about the perpendicular axis. The workpiece can be inserted into this selected holder, for example by feeding it in its longitudinal direction, and it can then be further machined. Holders of the same type may also be arranged on the support, if appropriate. This is expedient, for example, if, during the machining of a turned-round workpiece, another workpiece is already to be inserted into a further holder.

It is especially preferred if the second and the further holders are designed differently, in particular as a steadyrest, as a tailstock quill, or as a power-operated clamping block.

In this way, a type of multifunction platform is provided. A change of function can be effected by simple rotation of the support. One holder may be designed, for example, as a tailstock quill with a mandrel accommodated therein, whereby a centering with sufficient support of the workpiece is made possible, in particular in the case of lathe working with relatively small cutting forces or in the case of short workpieces. Another holder may be designed as a steadyrest (lunette), with which relatively large cutting forces can be absorbed even during longitudinal lathe working. In this case, the steadyrest can support the workpiece, for example, at three circumferential points with fixed jaws or with rollers. With a holder which is designed as a power-operated clamping block and in which the workpiece is firmly fixed, the workpiece can be seized and turned round by rotating the support. Especially during milling or drilling operations, which are typical for traveling-column machines and which require the workpiece to be rigidly fixed, the use of a power-operated clamping block as holder is preferred.

Preferably. the holders are releasably fastened to the support, so that they can be exchanged for holders having different functions. Owing to this modular design, the multifunction platform can be adapted to widely differing requirements.

In addition, it is especially preferred if the first holder is arranged so as to be spatially fixed relative to the machine tool, and the second holder is arranged so as to be traversable parallel to the longitudinal axis of the workpiece.

This has the advantage that the second holder, which for this purpose is preferably designed as a steadyrest, can be traversed into the immediate vicinity of the instantaneous machining point. In this way, the workpiece can be optimally supported in short sections, so that any bending moments which might occur do not lead to deformation of the workpiece. Furthermore, the traversing capability enables the second holder, preferably together with a support to which it is fastened with further holders, to be moved out of the machining region to such an extent that it does not impair the machining of a workpiece accommodated in the first holder.

If the second holder enables the workpiece to be firmly fixed in the longitudinal direction, as is the case, for example, with a power-operated clamping block, the latter may also be used as a feeding unit for the workpiece. Thus, for example, sections of the workpiece can be successively machined by advancing the workpiece by a corresponding section length, after the machining of a section, and by the machining being continued at the next section, while the workpiece is always being held by the first holder. In this way, such workpieces which are longer than the machining region that can be reached by the traveling column can also be machined. The length of the workpiece can even be greater as the width of the machine tool, provided an optional machine housing has suitable openings for the workpieces to pass through.

The first holder can likewise be designed as a power-operated clamping block. This is preferred, for instance, when it is only intended to machine the workpiece on its longitudinal side pointing towards the tool spindle, so that no rotation of the workpiece about its longitudinal axis is required.

In another preferred embodiment, the first holder is designed as a lathe spindle.

In this way, a lathe working operation on the workpiece is possible. Instead of the lathe spindle, a rotary table may also be used as the first holder, this rotary table permitting an infeed at a precise angle and thus four-sided machining of the workpiece held therein. A preferred first holder is furthermore an NC lathe spindle, which combines the properties of a lathe spindle with those of a rotary table, i.e. high number of revolutions and positioning at a precise angle.

It goes without saying that the above-mentioned features and the features still to be explained below can be used not only in the respectively specified combination but also in other combinations or on their own without departing from the scope of the present invention.

BRIEF DESCRIPTION OF THE DRAWINGS

Further features and advantages of the invention can be taken from the following description of an exemplary embodiment of the new machine tool with reference to the drawing, in which:

FIG. 3 shows a side view of a spindle housing of the machine tool shown in FIG. 1, in which different arrangements of a swivel axis are indicated;

FIGS. 4a and 4b show paths of movement of tools during swiveling for the two arrangements of the swivel axis shown in FIG. 3;

DETAILED DESCRIPTION OF PREFERRED EMBODIMENTS

Figure 1:
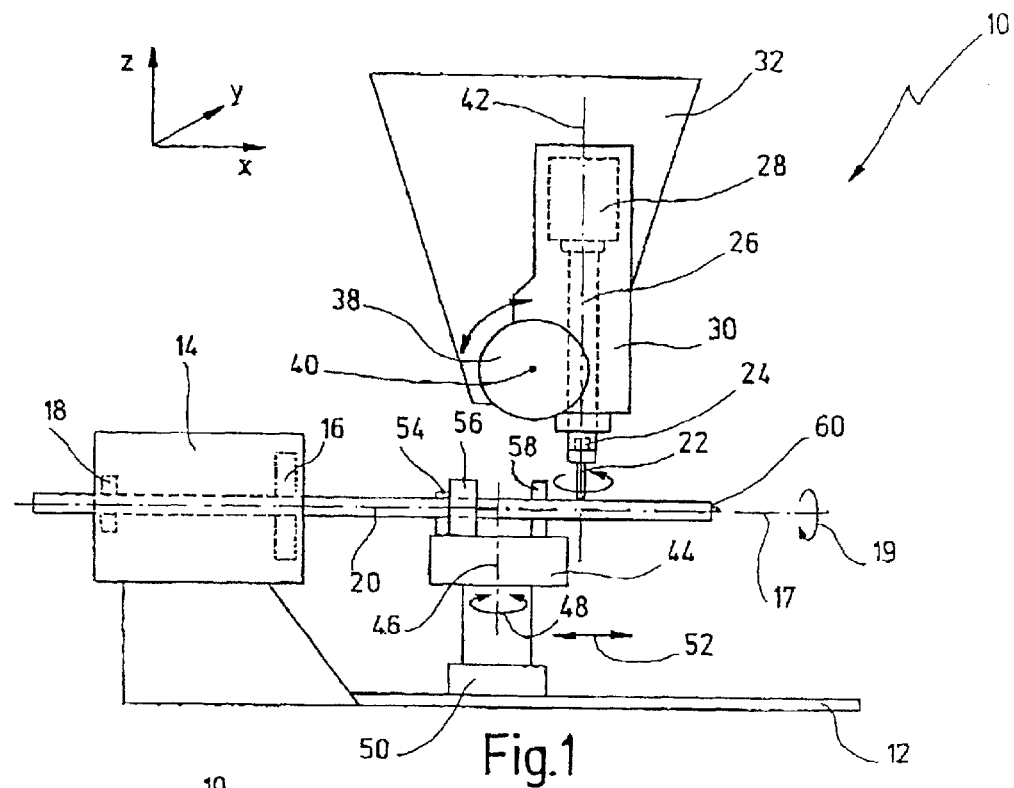
FIG. 1 shows a side view of some subassemblies of a new machine tool in a simplified schematic representation.

In a schematic simplified representation, FIG. 1 shows important subassemblies of a new machine tool, this machine tool being designated overall by 10 and being designed as a traveling-column machine. Fastened to a machine bed 12 is an NC lathe spindle 14, in which chuck jaws 16 and a shaft encoder 18 connected to a control (not shown) of the machine tool are only indicated schematically. By means of the NC lathe spindle 14, a rod-shaped workpiece 20 clamped in the chuck jaws 16 can be set in rotation about a longitudinal axis (indicated by 17), as indicated in FIG. 1 by an arrow 19. In this case, the rotary frequency is so high—preferably several thousand revolutions per minute—that the workpiece 20 can be subjected not only to a milling and drilling operation on the traveling-column machine, but also to a lathe working operation. The shaft encoder 18 detects the angular position of the workpiece 20, as a result of which a precise angular orientation of the workpiece 20, as is known, for instance, from conventional NC rotary tables, is made possible. In this way, the workpiece 20 can be fed in at a precise angle in order to be able to carry out the milling work and the like, which is conventional for a traveling-column machine, at the circumferential surface of said workpiece 20.

The workpiece 20 is machined with a tool 22 which is accommodated in a tool carrier 24 of a tool spindle 26. The tool spindle 26 is accommodated in a spindle housing 30 together with a drive 28 (indicated only schematically in FIG. 1).

With the spindle housing 30, the tool spindle 26 is fastened to a traveling column 32 in such a way as to be swivellable. The traveling column 32 is adapted to traverse in all three spatial directions, i.e. in the vertical Z and in both horizontal spatial directions X and Y. The swiveling capability of the spindle housing 30 relative to the traveling column 32 is achieved by a swiveling device 38, which may have, for example, a swivel shaft reaching over the entire extent of the spindle housing 30 in the Y-direction. The swiveling device 38 establishes a swivel axis 40 which runs in the Y-direction, i.e. perpendicularly to both the longitudinal axis 17 of the workpiece 20 and the spindle axis 42, about which the tool spindle 26 is set in rotation by the drive 28.

Furthermore, the machine tool 10 has a support 44 which can be rotated in a motor-operated manner about an axis 46 perpendicular to the horizontal longitudinal axis 17 of the workpiece 20, as indicated in FIG. 1 by an arrow 48. To this end, the support 44 is connected via a joint to a rider 50, which is guided on rails (which cannot be seen in FIG. 1), so that it can be traversed in a motor-operated manner in the X-direction, as indicated by an arrow 52.

Arranged on the support 44 are three holders 54, 56 and 58, which hold or support the workpiece 20 like an abutment. Further details concerning the holders 54, 56 and 58 are explained in the following with reference to FIGS. 5a to 5d.

During a lathe working operation on the workpiece 20, which is likewise possible on the traveling-column machine 10, the workpiece 20 is set in rotation by the NC work spindle 14, while a suitable tool 22, e.g. a lathe tool, profiles the workpiece 20. The tool spindle 26, in which this tool is clamped, is locked for this purpose, so that it cannot rotate. In this case, the traveling column 32 with the tool spindle 26 fastened thereto moves in both the Z-direction and the X-direction. During other machining operations, e.g. drilling or milling on the circumferential surface of the workpiece 20, the latter is first of all shifted into the desired angular position by means of the NC work spindle 14 and is then machined with a suitable tool 22, which is set in rotation by the tool spindle 26.

If the workpiece 20 is to be machined at its end face 60, the spindle housing 30 is swiveled about the swivel axis 40 until the tool spindle 26 has assumed the desired angular position relative to the longitudinal axis 17 of the workpiece 20.

Figure 2:
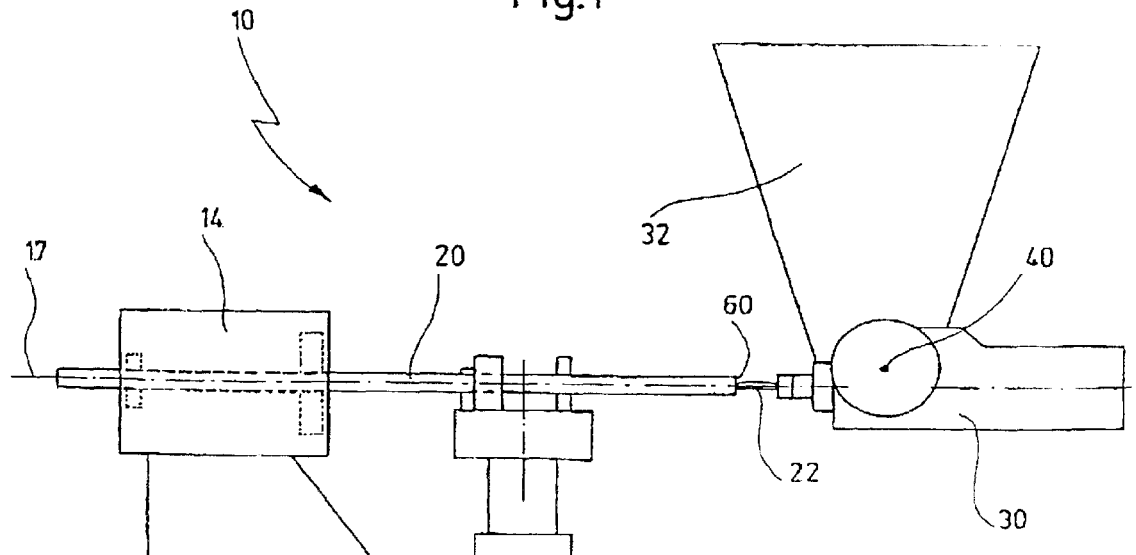
FIG. 2 shows the machine tool from FIG. 1 with swiveled tool spindle.

FIG. 2 shows the machine tool 10 with a spindle housing 30 swiveled in such a way. In addition, in order to be able to reach the end face 60 of the workpiece 20 from the position shown in FIG. 1, the traveling column 32 has been traversed in the X-direction and also in the Z-direction. In the machining position shown in FIG. 2, the spindle housing 30 has been swiveled by 90° relative to its vertical position shown in FIG. 1, so that the tool 20 can act perpendicularly on the end face 60 of the workpiece 20. At swivel angles greater than 90°, the tool 22 can also reach under the workpiece 20, a factor which is expedient, for instance, when the workpiece 20 cannot be rotated about its longitudinal axis 17 or when a simple clamping block is used as holder instead of an NC work spindle 14.

In the machine tool 10 shown in FIG. 1, the swivel axis 40 is arranged so as to be offset from the spindle axis 42 and therefore does not intersect the latter. In FIG. 3, which shows the spindle housing 30 with the swiveling device 38, this offset is designated by d; furthermore, an alternative arrangement of a swiveling device 38' in which the swivel axis 40' intersects the spindle axis 42 is indicated by a broken line. Depending on whether or not the swivel axis 40 intersects the spindle axis 42, different paths of movement are obtained for the spindle housing 30 and in particular for the tool 22 accommodated in the tool spindle 26.

These paths of movement are shown in FIGS. 4a and 4b. In the machine tool shown in FIG. 4a, the swivel axis 40 is offset from the spindle axis 42 by the distance d, as is also the case in FIG. 1. During the transition between a vertical and a horizontal position (cf. FIGS. 1 and 2), the tip of the tool 22 describes a section of a circular path 62. During this swiveling movement, the tip of the tool 22 covers a total distance s in the vertical Z.

FIG. 4b shows a machine tool in which the swivel axis 40' intersects the spindle axis 42. In this case, the tip of the tool 22 likewise describes a section of a circular path 62', the radius of which, however, is smaller than that of the circular path 62. From a comparison between FIGS. 4a and 4b, it can be seen that the distance s' which the tip of the tool 22 covers in the vertical Z in this case is greater than the distance s which can be covered in the Z-direction when swivel axis 40 and spindle axis 42 are arranged so as not to intersect. If the workpiece 20 is therefore to be machined in one spatial direction and then perpendicularly thereto by the tool 22, the machine tool shown in FIG. 4a requires a smaller traverse path of the traveling column 32 in the vertical (Z-direction) than is the case in the machine tool according to FIG. 4b. On account of this smaller traverse path, the overall height of the machine tool can be reduced.

In addition, it can be seen from FIG. 3 that the swivel axis 40 is located in the front quarter of the spindle housing 30, i.e. as close to the tool 22 as possible. This measure helps to keep the radius of the circular path 62 small and thus the requisite traverse paths for the traveling column 32 small. As can be seen in FIG. 3, however, the swivel axis 40 should also not be arranged too close to the tool 22, since the swiveling device 38 may otherwise be in the way during the machining of the workpiece 20.

FIGS. 5a to 5d show the machine tool 10 in plan view, the traveling column 32 with the spindle housing 30 fastened thereto not being shown. In particular, the NC work spindle 14 with the workpiece 20 held therein and also the support 44, which is traversable on rails 64 and 66 in the X-direction indicated by 52, can be seen in the plan view.

The three holders 54, 56 and 58 are arranged on the support 44 eccentrically to the perpendicular axis 46. In this case, the arrangement is made in such a way that, when the support 44 is rotated about the perpendicular axis 46, the holders 54, 56 and 58 are oriented in their respective machining position coaxially to the NC work spindle 14 or to the workpiece 20 held therein.

Figure 5A:
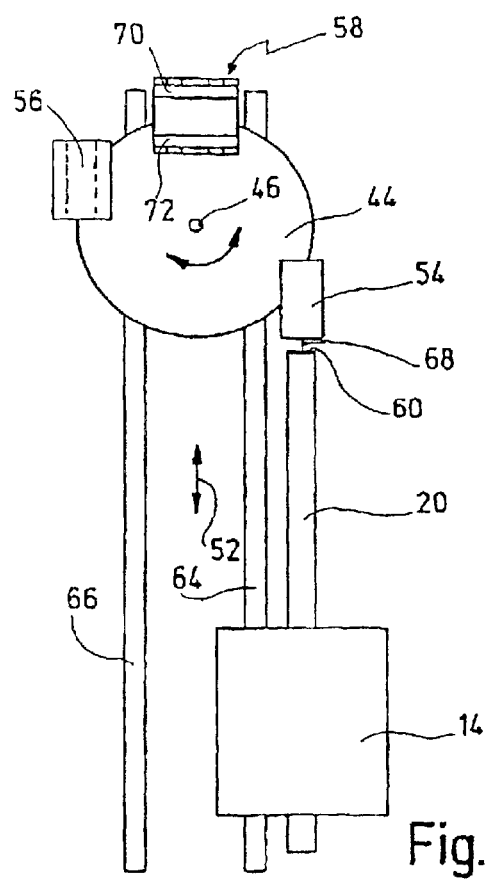
FIGS. 5a to 5d show a plan view of the machine tool shown in FIG. 1, in a simplified schematic representation, in which a multifunction platform with a plurality of holders in different rotary positions can be seen.

The holder 54, which in FIG. 5a is in the functional position, is designed as a tailstock quill having a mandrel 68 which holds the workpiece 20 at its end face 60, as is expedient, for example, for centering during a lathe working operation.

Figure 5B:
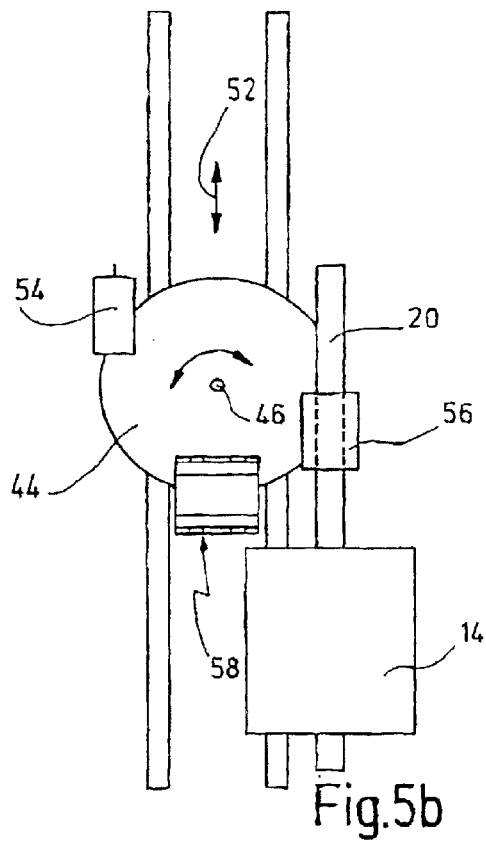

The holder 56, which in FIG. 5b is in the functional position, is designed as a steadyrest, through which the workpiece 20 can be passed. In the process, the steadyrest 56 supports the workpiece 20 in such a way that, even with relatively large cutting forces, machining in the vicinity of the steadyrest 56 is possible without bending forces which occur leading to deformation of the workpiece 20. By the support 44 being traversed in the direction of arrow 52, the workpiece 20 can be supported where machining is to be carried out. In this way, the workpiece 20 can always be supported in short sections.

Figure 5C:
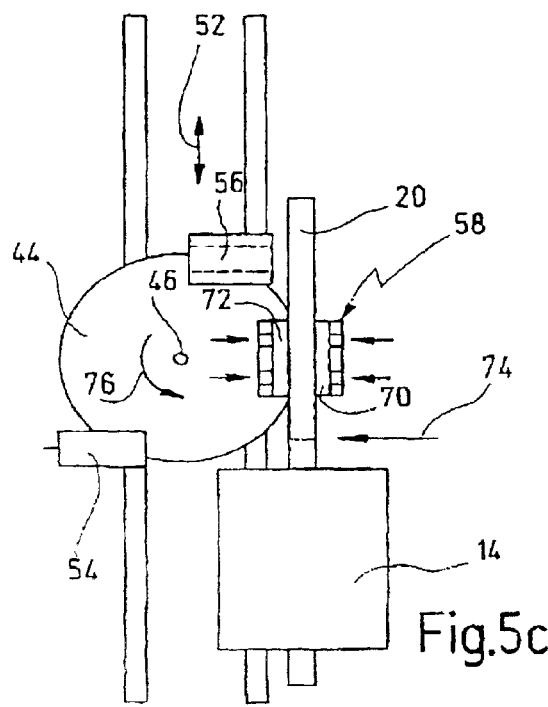
Figure 5D:
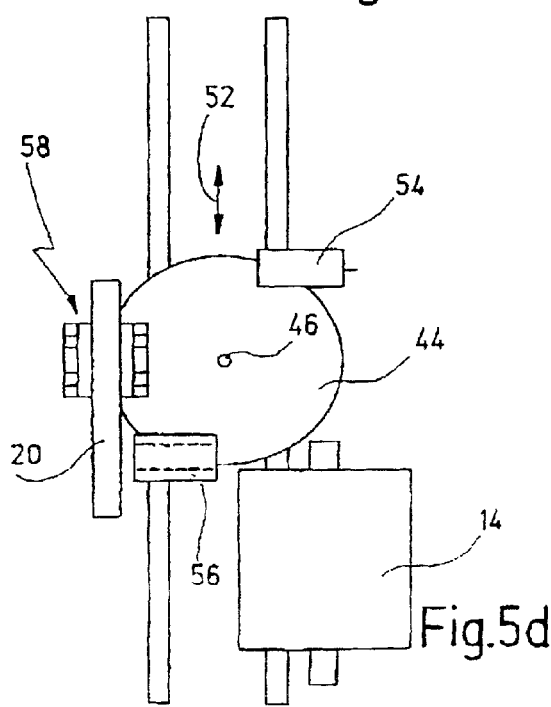

The holder 58, which is oriented coaxially to the NC work spindle 14 in FIG. 5c and parallel thereto in FIG. 5d, is designed as a power-operated clamping block which has hydraulically operable clamping jaws 70 and 72. A workpiece 20 can be firmly fixed by means of the power-operated clamping block 58, as is generally required during drilling and milling work. In addition, the power-operated clamping block 58 can be used to effect a feeding of the workpiece 20 in the X-direction. In this way, longer workpieces can also be machined successively.

To turn round the workpiece 20, it is first of all severed by sawing or milling at the point identified by an arrow 74 in FIG. 5c. The support 44 with the holders fastened thereto is then rotated by 180° in the direction of an arrow 76, as a result of which the workpiece part 20' still fixed in the power-operated clamping block 58 is swiveled. In this case, the workpiece part 20' shifts into the position shown in FIG. 5d. In this turned-round position, the workpiece part 20' can also be machined on its side previously pointing towards the NC work spindle 14. The power-operated clamping block 58 therefore has two machining positions, namely one machining position coaxial to the first holder and a second parallel thereto.

A workpiece 20 may of course also be turned round without being cut off beforehand. In this case, by the support 44 being traversed in the X-direction 52, the workpiece 20 merely has to be pulled out of the NC work spindle 14 until it is no longer held by the latter. The workpiece 20 can then be turned round, as just described, by rotating the support 44 about the perpendicular axis 46. Depending on the type of machining, it may possibly also be sufficient to rotate the support 44 by less than 180°, e.g. by 90°. Even then, however, the clamping point or cutting-off point is at least partly accessible for machining.

The support 44 therefore constitutes a multifunction platform on which holders having different functions can be shifted into a working position by simple rotation about the perpendicular axis 46. Together with the traversing capability of the support 44 in the X-direction 52, a wide variety of machining possibilities are obtained for the workpiece 20. The holders 54, 56 and 58 are preferably releasably fastened to the support 44, so that they can be exchanged for holders having other functions.

Figure 6:
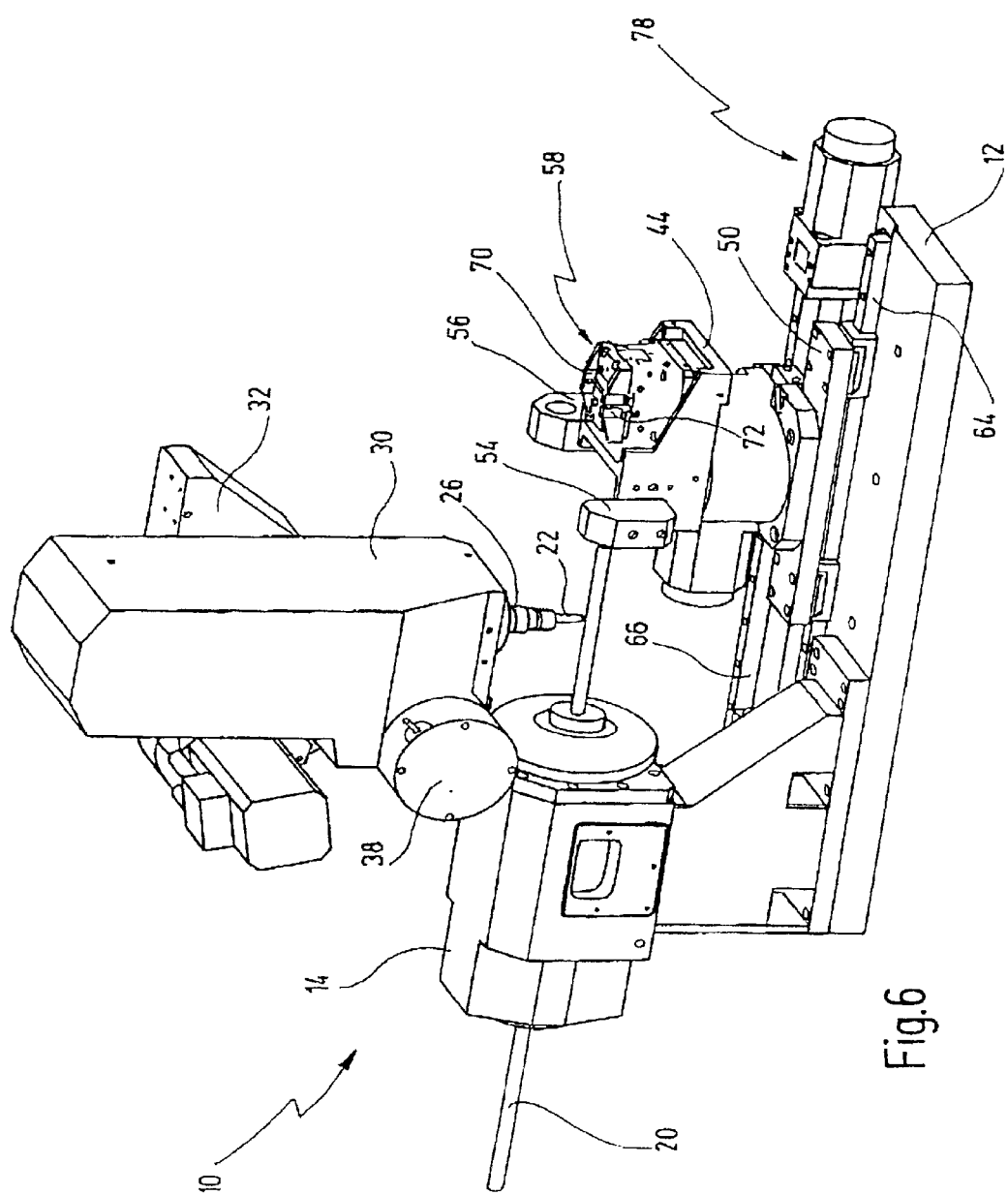
FIG. 6 shows the machine tool of FIG. 1 in a perspective representation, in which, in accordance with FIG. 5a, a rod-shaped workpiece is held between an NC lathe spindle and a tailstock quill.
Figure 7:
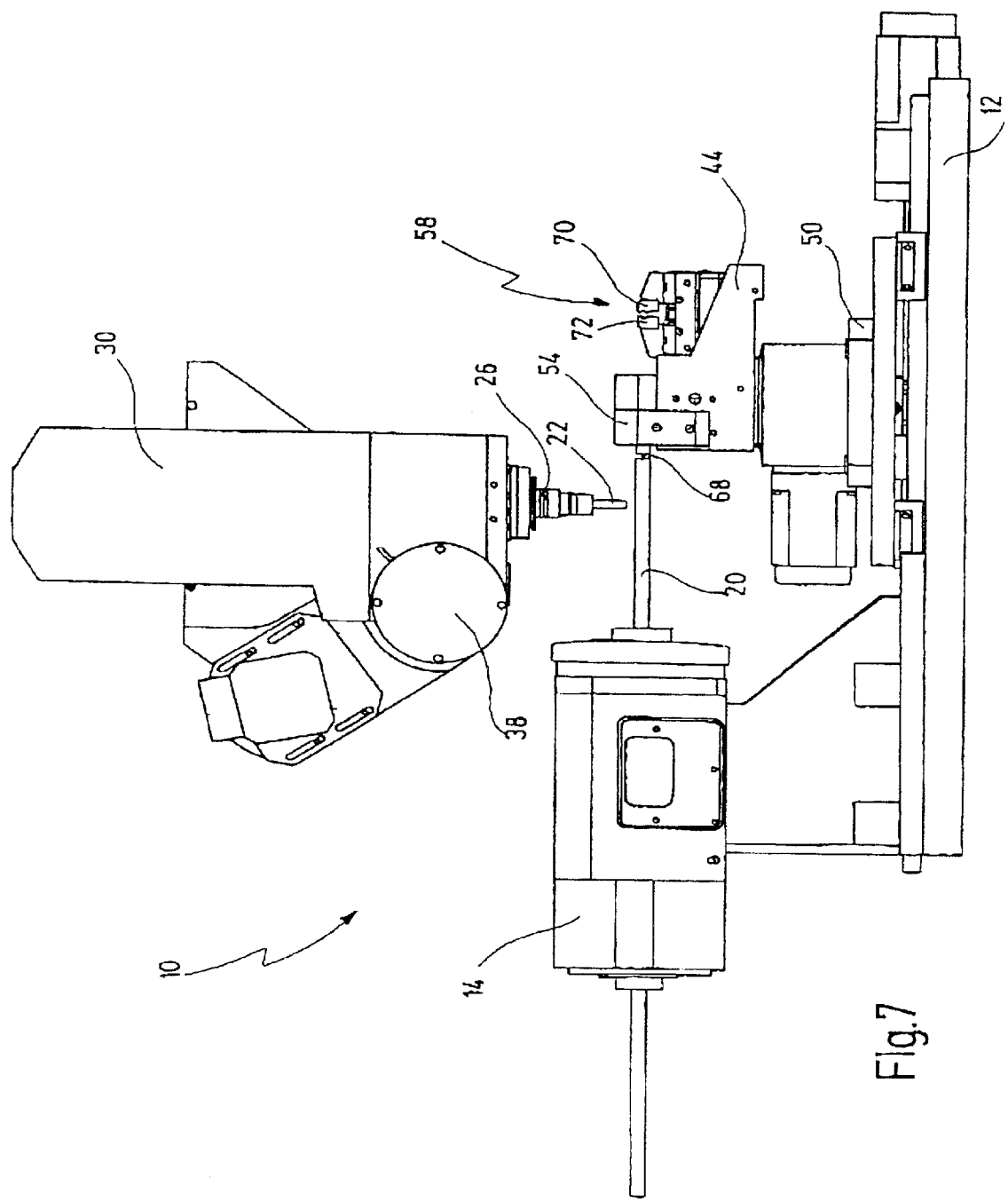
FIG. 7 shows the machine tool of FIG. 6 in a front view.

FIGS. 6 and 7, in a perspective representation and in a front view, respectively, show the machine tool 10 in the machining position shown in FIG. 5a. Numerous additional design details of the inventive machine tool 10 can be seen in this representation, e.g. an automatic feed device 78 for traversing the support 44. FIGS. 6 and 7 show the machine tool 10 during the machining of a cylindrical workpiece 20 which is clamped in the NC work spindle 14 and is centered at its free end by means of the mandrel 68 of the tailstock quill 54. The tool 22 in this case is a lathe working tool.

Figure 8:
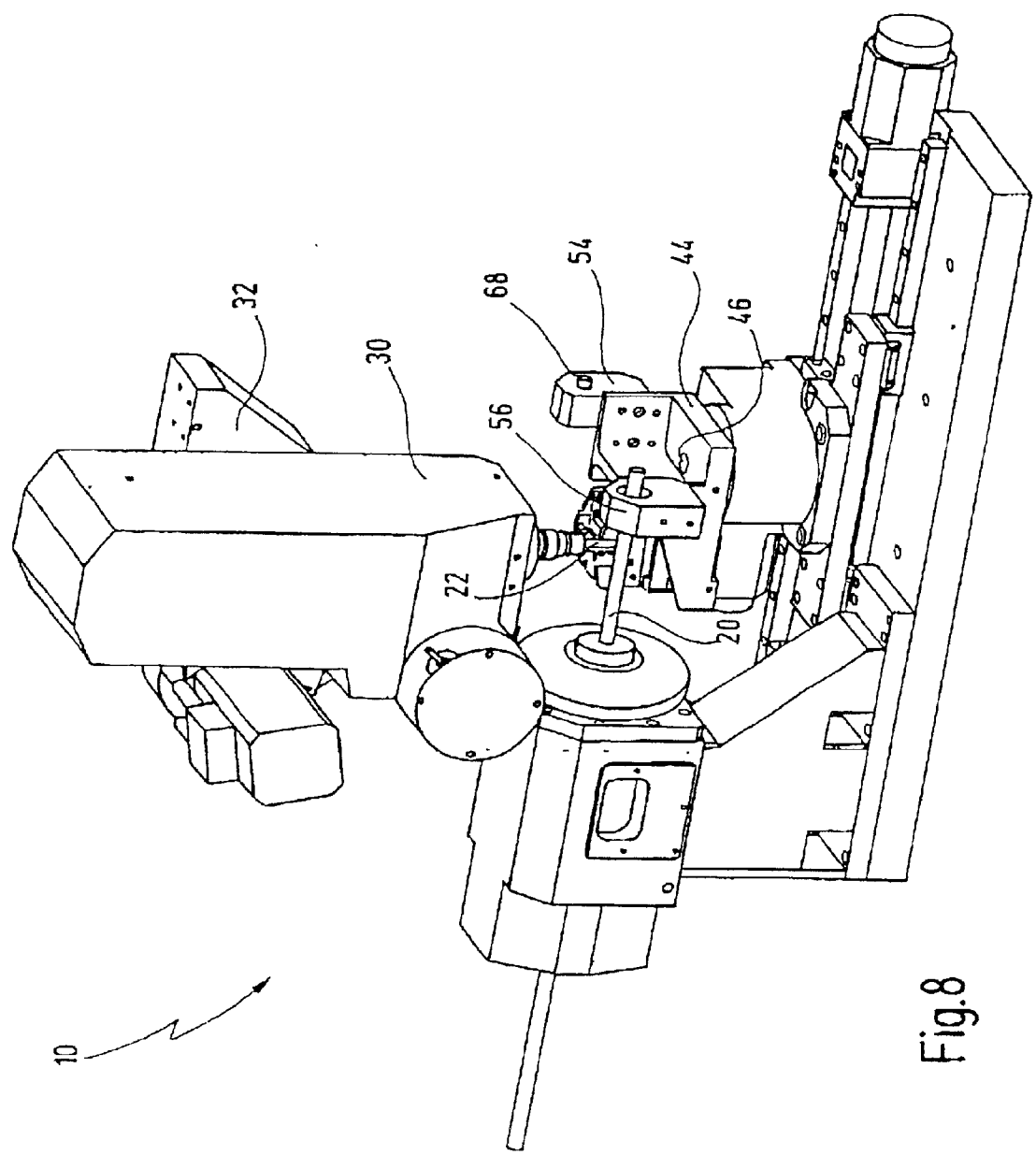
FIG. 8 shows the machine tool of FIG. 1 in a perspective representation, in which, in accordance with FIG. 5b, a rod-shaped workpiece is held by an NC lathe spindle and a steadyrest.
Figure 9:
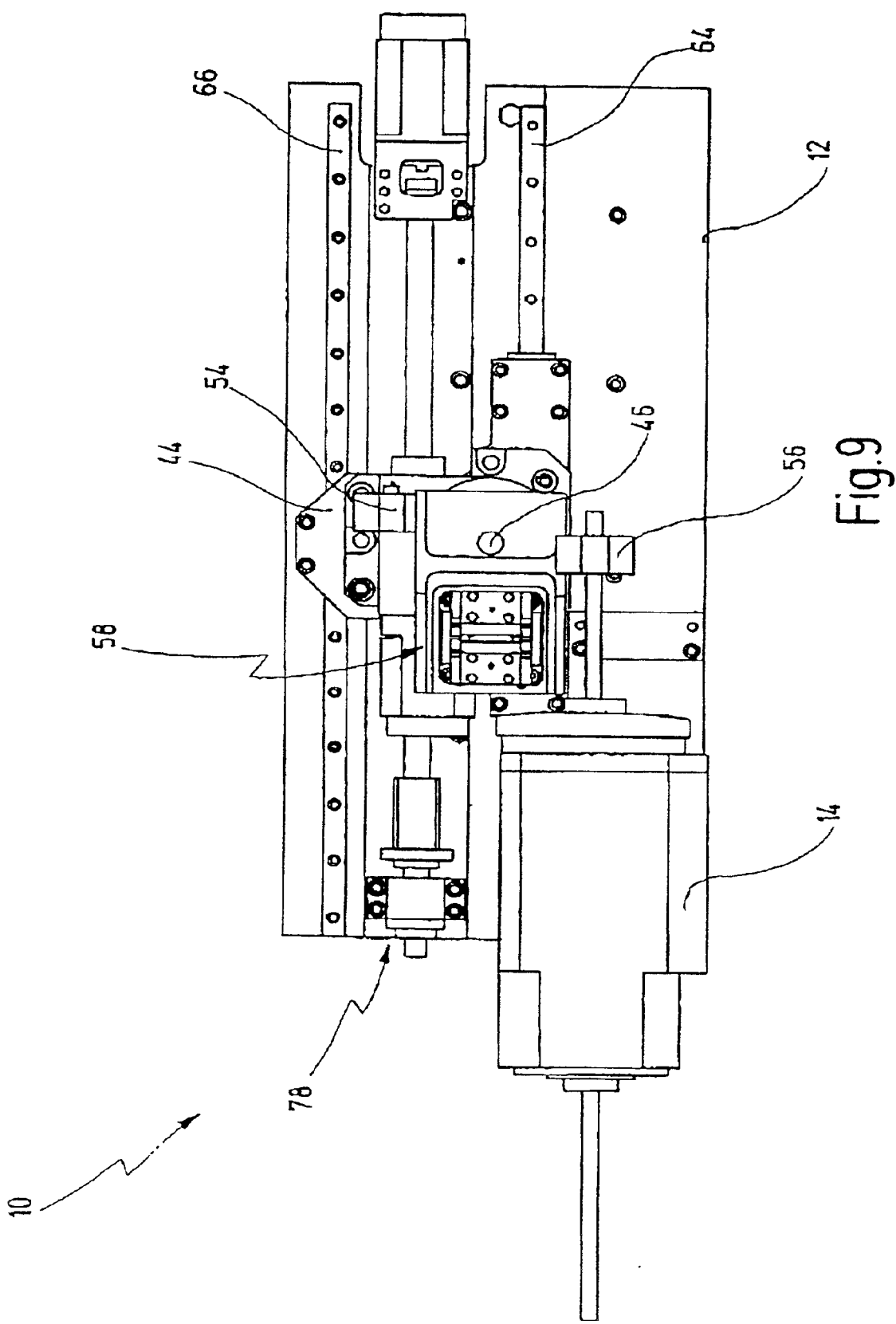
FIG. 9 shows the machine tool of FIG. 8 in a plan view.

FIGS. 8 and 9, in a perspective representation and in plan view, respectively, show the machine tool 10 in the machining position shown in FIG. 5b. Here, the cylindrical workpiece 20 is held by the NC work spindle 14 and the steadyrest 56. In order to shift the machine tool 10 from the machining position shown in FIGS. 6 and 7 into the machining position shown here, the support 44 is first of all run back, then rotated by 180° about the perpendicular axis 46 and finally traversed again towards the NC work spindle 14.

During the lathe working operation by means of the tool 22, the support 44 with the steadyrest 56 fastened thereto can be traversed synchronously with and parallel to the traveling column 32, so that short support of the workpiece 20 is always ensured.

Figure 10:
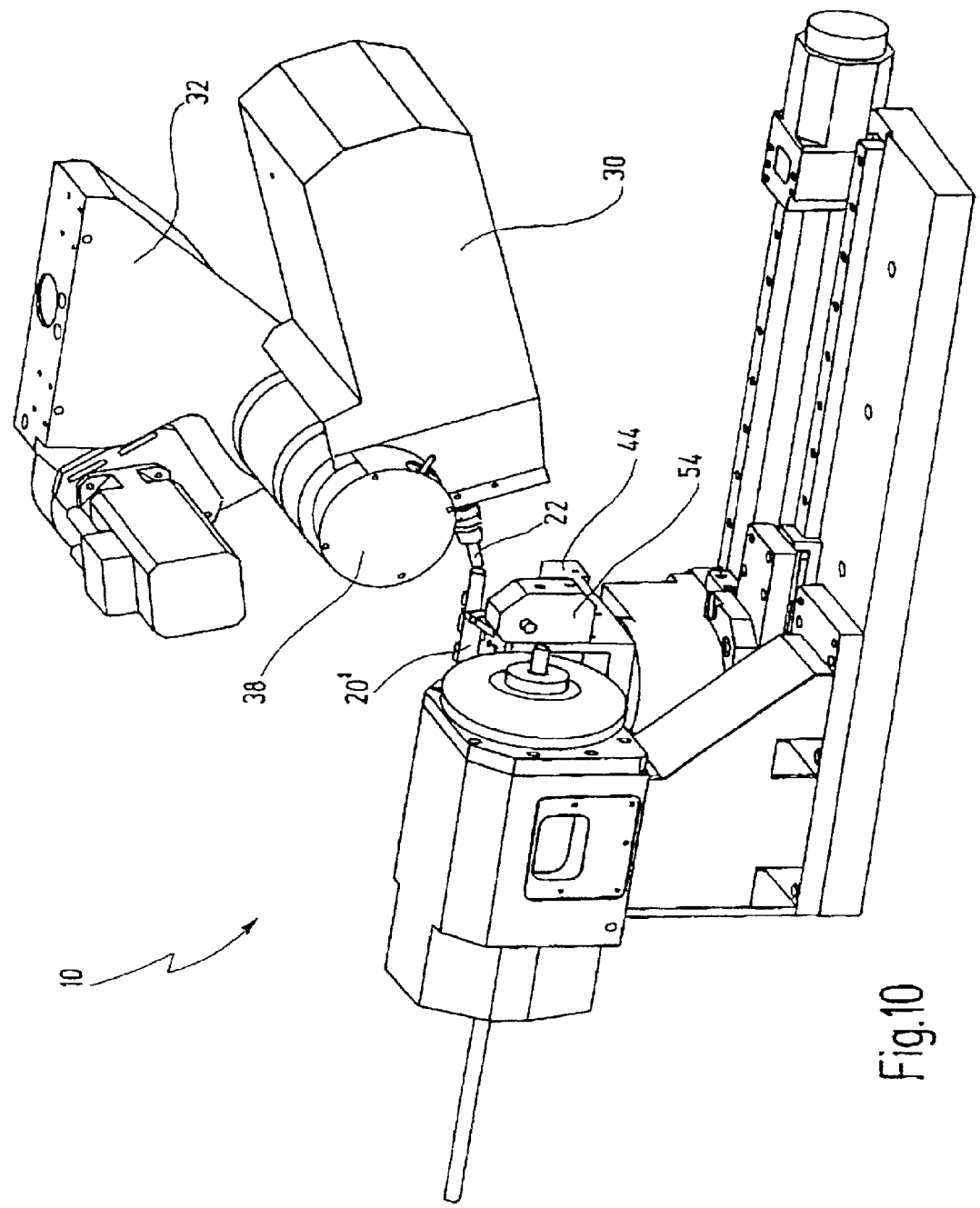
FIG. 10 shows the machine tool of FIG. 1 in a perspective representation, in which, in accordance with FIG. 5d, a rod-shaped workpiece is held by an NC lathe spindle and a power-operated clamping block turned round by 180°.

FIG. 10, in a perspective representation, shows the machine tool 10 in a machining position which corresponds to that shown in FIG. 5d. Here, the end face which has become accessible after the workpiece 20 has been turned round is machined by a tool 22, the spindle housing having been swiveled by about 80° relative to the position shown in FIG. 8.

What is claimed is:

1. A machine tool for machining a rod-shaped workpiece having a first axis, said machine tool comprising;
   a traveling column,
   a tool spindle which is adapted to rotate about a second axis, said tool spindle being arranged on said traveling column, and
   a swiveling device for swiveling said tool spindle about a third axis,
   wherein said third axis is arranged perpendicularly to both said first axis and said second axis, and said second axis and said third axis are spaced apart from one another such that they do not intersect,
   a spindle housing accommodating said tool spindle, said spindle housing having a front half and a tool carrier located in said front half, and
   wherein said third axis runs in said front half of said spindle housing.

2. The machine tool of claim 1, wherein said swiveling device is capable of swiveling said tool spindle about said third axis by a swivel angle of at least 90°.

3. The machine tool of claim 1, further comprising a drive for driving said tool spindle, said drive being also accommodated in said spindle housing.

4. The machine tool of claim 1, wherein said front half of said spindle housing comprises a front quarter, said tool carrier being located in said front quarter, and wherein said third axis runs in said front quarter.

5. The machine tool of claim 1, further comprising a first holder and a second holder each for holding a workpiece to be machined, wherein said second holder is adapted to rotate or swivel about a fourth axis which is perpendicular to said first axis.

6. The machine tool of claim 5, wherein said second holder is oriented coaxially to said first holder in a machining position for machining workpieces.

7. The machine tool of claim 5, wherein said second holder is adapted to rotate or swivel about said fourth axis by at least 180°.

8. The machine tool of claim 5, wherein said second holder is arranged on a support which is rotatable about said fourth axis.

9. The machine tool of claim 8, wherein said second holder is arranged on said support eccentrically with respect to said fourth axis.

10. The machine tool of claim 9, further comprising at least one third holder being arranged on said support eccentrically to said fourth axis, wherein, by rotation of said support about said fourth axis, one of said second and third holders can be shifted into a position coaxial to said first holder.

11. The machine tool of claim 10, wherein said second and said third holders are designed differently.

12. The machine tool of claim 10, wherein said second and said third holders each are designed as one of the following: a steady rest, a tailstock quill, or a power-operated clamping block.

13. The machine tool of claim 10, wherein said second and third holders are releasably fixed to said support.

14. The machine tool of claim 5, wherein said first holder is arranged so as to be spatially fixed, and said second holder is adapted to be traversed parallel to said first axis relative to said first holder.

15. The machine tool of claim 5, wherein said first holder is designed as a lathe spindle.

16. The machine tool of claim 5, wherein said first holder is designed as a clamping block.

17. A machine tool for machining a rod-shaped workpiece having a first axis, said machine tool comprising:
   a traveling column;
   a tool spindle which is adapted to rotate about a second axis, said tool spindle being arranged on said traveling column;
   a swiveling device for swiveling said tool spindle about a third axis,
   wherein said third axis is arranged perpendicularly to both said first axis and said second axis; and
   a first holder and a Beyond holder each for holding a workpiece to be machined,
   wherein said second holder is adapted to rotate or swivel about a fourth axis which is perpendicular to said first axis, and
   wherein said first holder is arranged so as to be spatially fixed, and said second holder is adapted to be traversed parallel to said first axis relative to said first holder, and said second axis and said third axis are spaced apart from one another such that they do not intersect.

18. The machine tool of claim 17, wherein said swiveling device is capable of swiveling said tool spindle about said third axis by a swivel angle of at least 90°.

19. The machine tool of claim 17, wherein said second holder is oriented coaxially to said first holder in a machining position for machining workpiece.

20. The machine tool of claim 17, wherein said second holder is adapted to rotate or swivel about said fourth axis by at least 180°.

21. The machine tool of claim 17, wherein said second holder is arranged on a support which is rotatable about said fourth axis.

22. The machine tool of claim 21, wherein said second holder is arranged on said support eccentrically with respect to said fourth axis.

23. The machine tool of claim 22, further comprising at least one third holder being arranged on said support eccentrically to said fourth axis, wherein, by rotation of said support about said fourth axis, one of said second and third holders can be shifted into a position coaxial to said first holder.

24. The machine tool of claim 23, wherein said second and said third holders are designed differently.

25. The machine tool of claim 23, wherein said second and said third holders each are designed as one of the following: a steady rest, a tailstock quill, or a power-operated clamping block.

26. The machine tool of claim 23, wherein said second and third holders are releasably fixed to said support.

27. The machine tool of claim 17, wherein said first holder is designed as a lathe spindle.

28. The machine tool of claim 17, wherein said first holder is designed as a clamping block.

* * * * *

UNITED STATES PATENT AND TRADEMARK OFFICE
CERTIFICATE OF CORRECTION

PATENT NO. : 6,836,941 B2  Page 1 of 1
DATED : January 4, 2005
INVENTOR(S) : Dirk Prust et al.

It is certified that error appears in the above-identified patent and that said Letters Patent is hereby corrected as shown below:

<u>Column 10,</u>
Line 23, "Beyond" should read -- second --; and
Line 38, "workpiece." should read -- workpieces. --.

Signed and Sealed this

Twenty-eighth Day of March, 2006

JON W. DUDAS
*Director of the United States Patent and Trademark Office*